US010721528B1

United States Patent
Palu et al.

(10) Patent No.: US 10,721,528 B1
(45) Date of Patent: Jul. 21, 2020

(54) SYSTEM AND METHOD FOR PREDICTING SPECIFIC AUDIENCE RESPONSE TO NEW ENTERTAINMENT CONTENT

(71) Applicant: Parrot Analytics Limited, Auckland (NZ)

(72) Inventors: Sione K. Palu, Auckland (NZ); Arturas Vedrickas, Auckland (NZ); Johan Chan, Auckland (NZ); Wared Seger, Auckland (NZ)

(73) Assignee: Parrot Analytics Limited, Auckland (NZ)

( * ) Notice: Subject to any disclaimer, the term of this patent is extended or adjusted under 35 U.S.C. 154(b) by 0 days.

(21) Appl. No.: 15/683,661

(22) Filed: Aug. 22, 2017

Related U.S. Application Data

(60) Provisional application No. 62/378,496, filed on Aug. 23, 2016.

(51) Int. Cl.
*H04N 21/466* (2011.01)
*H04N 21/45* (2011.01)
*H04N 21/4788* (2011.01)
*H04N 21/442* (2011.01)
*G06N 20/00* (2019.01)

(52) U.S. Cl.
CPC ......... *H04N 21/4662* (2013.01); *G06N 20/00* (2019.01); *H04N 21/44213* (2013.01); *H04N 21/4532* (2013.01); *H04N 21/4788* (2013.01)

(58) Field of Classification Search
CPC ......... H04N 21/4662; H04N 21/44213; H04N 21/4532; H04N 21/4788; G06N 99/005
USPC .......................................................... 725/10
See application file for complete search history.

(56) References Cited

U.S. PATENT DOCUMENTS

| | | | |
|---|---|---|---|
| 9,288,123 B1 * | 3/2016 | Safford | G06Q 50/01 |
| 2002/0065802 A1 * | 5/2002 | Uchiyama | G06F 16/9535 |
| 2013/0014136 A1 * | 1/2013 | Bhatia | H04N 21/252 725/9 |
| 2014/0358805 A1 * | 12/2014 | Cama | G06Q 50/265 705/319 |
| 2015/0347920 A1 * | 12/2015 | Medlock | G06F 17/30687 706/12 |
| 2016/0189057 A1 * | 6/2016 | Rao | G06N 99/005 706/12 |

(Continued)

OTHER PUBLICATIONS

Yi, J.; Jin, R.; Jain, S.; and Jain, A., Inferring users preferences from crowdsourced pairwise comparisons: A matrix completion approach. In First AAAI Conference on Human Computation and Crowdsourcing 2013 pp. 207-215. (Year: 2013).*

(Continued)

*Primary Examiner* — Alfonso Castro
(74) *Attorney, Agent, or Firm* — JRG Attorneys at Law

(57) ABSTRACT

A system and method for provision of global audience profiling and prediction concerning broadcast and streaming media from disparate data sources. The system facilitates the input of an unlimited number of data sources from online and offline origins including social media and other user generated content web sites. The system identifies key words related to sentiment, topic, and audience attribute. The system then uses a multi-task learning procedure to determine the response for each source and finally to generalize across all sources thus linking a specific audience with identifiable characteristics to a response concerning broadcast or streaming media.

15 Claims, 2 Drawing Sheets

(56) References Cited

U.S. PATENT DOCUMENTS

2017/0098165 A1* 4/2017 Yang .................. G06F 16/9535

OTHER PUBLICATIONS

Huang, S., et al. (2013) "Sentiment and topic analysis on social media: a multi-task multi-label classification approach." Proceedings of the 5th annual ACM web science Conference. ACM, 2013. (Year: 2013).*

Tan, B., et al (2013) "Multi-Transfer: Transfer Learning with Multiple Views and Multiple Sources". Proceedings of the 2013 SAIM International Conference on Data Mining (Year: 2013).*

* cited by examiner

SYSTEM AND METHOD FOR PREDICTING SPECIFIC AUDIENCE RESPONSE TO NEW ENTERTAINMENT CONTENT

PRIORITY CLAIM

This application claims priority to U.S. Provisional Patent Application No. 62/378,496, A System and Method for Provision of Global Audience Profiling and Prediction Concerning Broadcast and Streaming Media from Disparate Data Sources, filed on Aug. 23, 2016.

TECHNICAL FIELD

The present invention relates generally to broadcast and streaming media content and services, demand forecasting, content recommendations, and targeted marketing.

BACKGROUND OF THE INVENTION

Owners, creators, and distributors of media suitable for broadcast or streaming over the Internet need to understand the preferences and desires of their viewers (consumers). This is essential in decision making as to what media will be developed, distributed, streamed, or broadcast and what means will be used to distribute. A reliable and robust demand forecasting tool is desired.

Traditionally, audience demand is grossly estimated via polling and surveys. The key problems with this technique are (1) The technique is not able to segment the audience with enough granularity to target a sub-audience, (2) The technique can be slow (not real-time), relatively expensive, and most importantly, (3) Modern media content consumers do not communicate via polls and surveys—they use social media and other highly dynamic and temporally sensitive sources. Furthermore, even the limited audience segmentation that is possible with conventional methods is further constrained in the requirement that the parameters used for segmentation must be known beforehand. A desirable outcome would enable segmentation based on any emergent set of parameters that identify an audience segment for the purposes of profiling.

The present invention leverages the ubiquity of online products and services (e.g. forums, blogs, wikis, and social media) as well as offline sources (e.g. customer loyalty databases, consumer product registrations) to accurately and efficiently predict viewer sentiment of a specific audience pertaining to any type of broadcast or streaming media.

There are many ways that multiple data sources can be aggregated to make generalizations (e.g. support vector machine, Gaussian-process leaning, fuzzy-logic inference system, neural networks, Bayesian networks, evolutionary or genetic computation). The uniqueness of the present invention within the broadcast and streaming media domain is that the "audience" can be characterized in infinitely many (and often unpredictable) ways along multiple relevant attributes (e.g. age, geography, hobbies, social status) and these different audiences can be linked to attributes of the media in infinitely many ways. Most importantly, there are commonalities across audiences and across topics that can be useful in computing a generalization.

Multi-task learning (MTL) is one such machine learning technique that facilitates learning multiple simultaneous and related tasks using a shared symbolic representation. While the tasks' target outputs may be related, the data sources that drive the learning can be related or may be seemingly unrelated attribute-wise.

The present invention uses multi-label, multi-class classification adapted to the unique demands and characteristics of the broadcast and streaming media industry to "profile" an audience, thus predicting that specific audience's sentiment about that content to inform the content holder regarding demand forecasting services.

SUMMARY OF THE INVENTION

The present invention facilitates global audience profiling and prediction with regard to a specific topic (e.g. movie, TV show, or other broadcast and streaming media) by computing a response variable from any available web site, social media, or offline customer database and relating a specific audience to a specific topic, and then assessing the response of that audience to that topic. The response in question is often, but not always, related to the sentiment of that audience to a specific topic (e.g. a specifically characterized set of people like or dislike a specifically characterized topic). As a non-limiting example, the system could predict that males in New Zealand between the ages of 25 and 35 who own a pet would like dramas related to current events. The audience is highly particularized as is the topic, and neither is specified a priori—both emerge from the process.

The technical problem is that the response of the specific audience that media developers and owners need to identify exists within a myriad of data sources scattered around the Internet and in consumer databases. What is needed is a system and method to extract that response so that content developers and owners can predict which audience, as defined by an undetermined set of attributes, would react positively or otherwise to a specific content topic.

The system is comprised of a sourcing component that accesses available media and databases from any number of sources and extracts data from each in textual form. The aggregator subsystem then aggregates the sources into a coherent, consumable stream of data with common or unrelated attributes that the learning subsystem uses to inductively determine sentiment, topic, and audience for each source. The training subsystem accepts the individually learned elements and generalizes across all sources in a single learning model so that the classification subsystem can classify each label and class resulting in a response for a specific audience on a specific topic.

The advantages of this system are (1) The system is able to reliably relate a specific audience from its corresponding sources to a specific media topic and then calculate the response for that pair, (2) The system dynamically adapts to any identifying attribute that defines the audience, (3) The system functions equally well when it has abundant of instances with target class labels, or alternatively, when it has very sparse instances with target class labels in the learning or training phase to use in predicting instances that do not have target class labels.

Because the system contains a means for dynamic characterization, the audience can be defined infinitely many ways and therefore, the system is useful for (1) Improved content recommendations for end-users (e.g. content systems, video advertisement bidding, and programmatic advertising), (2) Determine demand for media (e.g. movies, TV, games, book) coming from specific audiences only, (3) Customized ("targeted") marketing tools based on how a certain audience comments on articles or other postings online, and (4) Anticipate emergence of a fan base towards a specific actor or media type.

DESCRIPTION OF THE INVENTION

Figure 1:
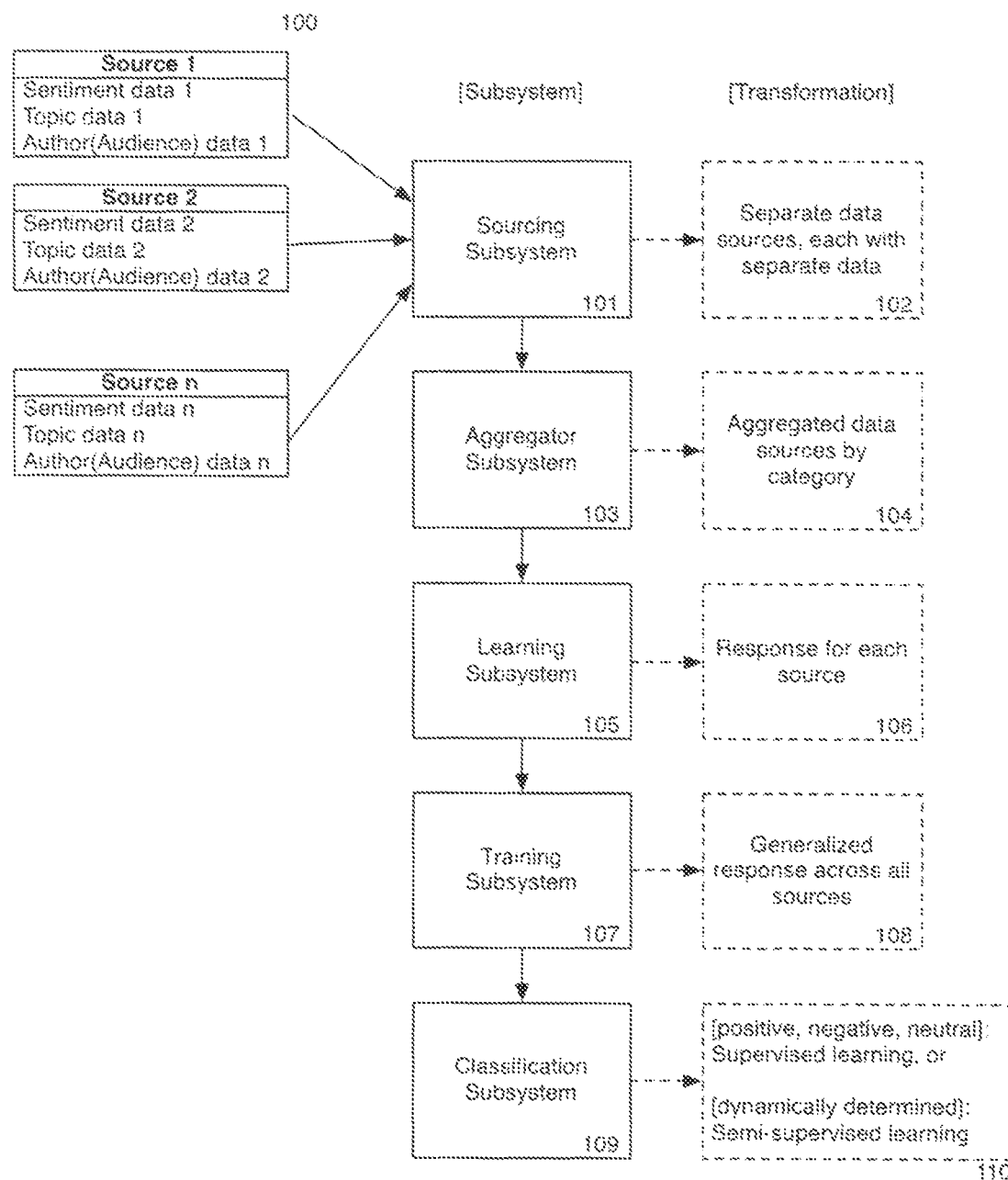
FIG. 1 is a schematic of the system components starting with the input data sources and ending with the classification that results in a sentiment response.
Figure 2:
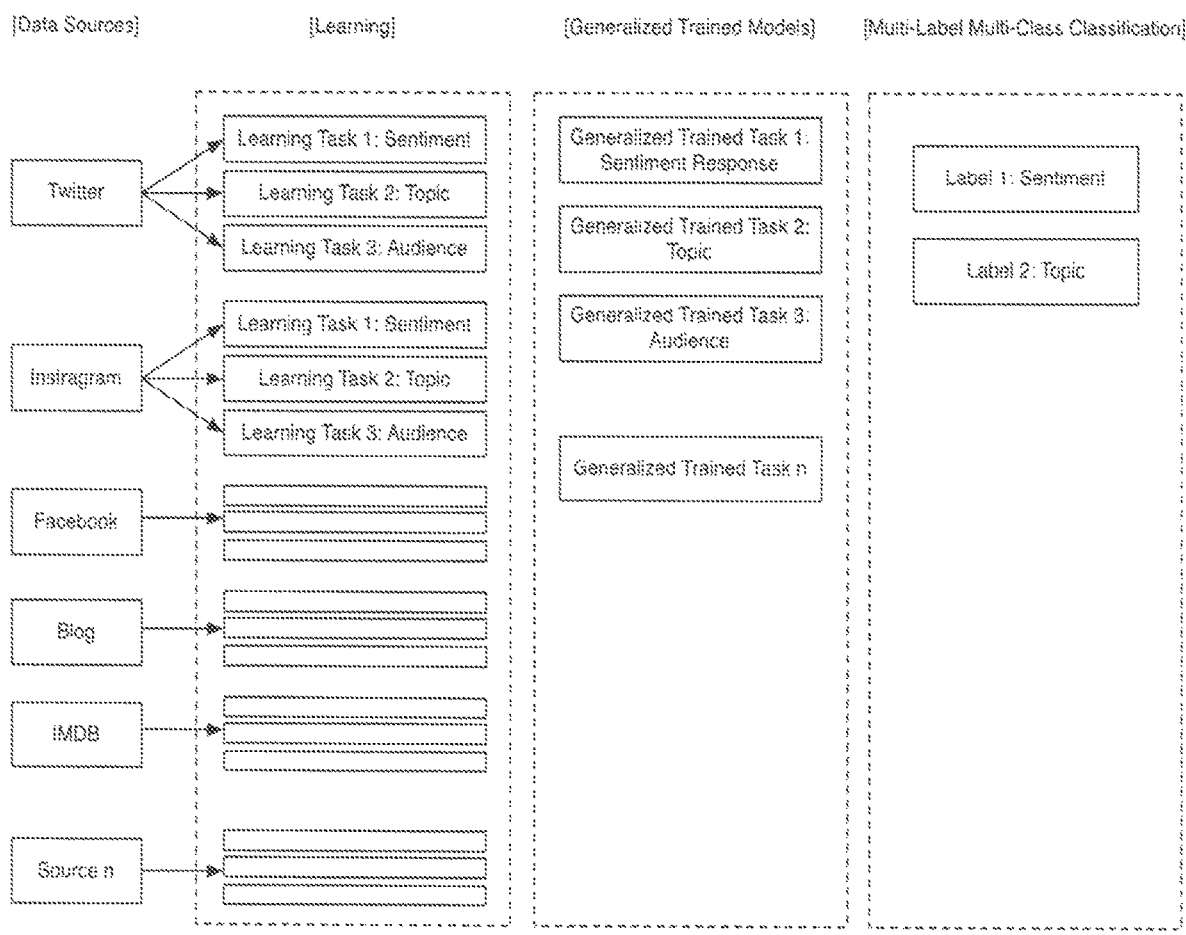
FIG. 2 is detailed flow diagram showing the individual data sources, the learning of individual tasks on those corresponding sources, the generalization of a model across sources, and finally a classification.

The system is comprised of five main subsystems that transform raw, unstructured data from online and offline sources into structured data that is subsequently analyzed for sentiment response of a specific audience.

The sourcing subsystem (101) is responsible for connecting to external data sources (100) and extracting information related to viewer sentiment from each source. The identified sources can be any online or offline source that might contain useful information that is either in textual form, or transformable into textual form. These include online forum web sites (with user-generated content), social media web sites (e.g. FACEBOOK, INSTRAGRAM, TWITTER, REDDIT), wiki web sites (e.g. WIKIPEDIA, IMDB), any blog web site with user comments, or any user comment on any news posting or other web page. Data sources might also be offline content such as customer loyalty databases, customer service or purchase histories, or similar. All of these contain information that could reflect on that person's likes and dislikes as they pertain to media consumption.

The method used is similar to Huang (2013) but here, the primary difference is that the present invention is not constrained to a single source and is therefore multi-domain and multi-source.

The sourcing subsystem requires an IP address or other identifier of the source for connection purposes. It is useful but not necessary to also have port information, client configuration, and encryption/decryption capabilities.

The data that the sourcing subsystem accesses can be in any native form, but will be converted to textual form for use by the system. The sourcing subsystem accesses the comment or other text of interest. It does not process the text. Processing occurs later in the learning subsystem. Other information that is useful but not necessary includes a comment score (e.g. number of "likes"), number of follow-on comments, and number of "in" links to that specific content. The sourcing subsystem uses a device identifier or equivalent to identify a specific household or user and associate it with metadata about that specific source. Lastly, the sourcing subsystem can also ingest data such as pictures, gifs, videos or media links if needed. In that case, the sourcing subsystem integrates a component responsible for processing this type of data. The role of this component is therefore to convert that data into textual data by (1) annotating the semantic information to be used as topical content information, and (2) extracting textual information that might be in the form of a caption, subtitle or others.

The sourcing subsystem produces separate data streams from each independent source (102) that include the content of that source/user and metadata about that content and user for subsequent processing.

The aggregator subsystem (103) accepts the independent streams of data from each source from the sourcing subsystem and aggregates the data by category so that it can be used efficiently by the learning subsystem. The primary categories of data here are (1) the audience data which is metadata about the source itself, (2) the sentiment content that contains indicators of likes and dislikes, and (3) the topical content that contains indicators of any topic that could be related back to the domain of concern—broadcast and streaming media. This means that topics such as purchasing habits of a consumer are (or could be) relevant in identifying that a particular aggregated audience tends to like a specific type of media. The topical category need not be specifically about the media itself. The aggregator subsystem produces aggregated data ready for processing by the learning subsystem (104).

The learning subsystem (105) uses a multi-task learning method to simultaneously process multiple streams of input data across multiple variables (which may be overlapped or not) to obtain a response via classification analysis which is unique to this system. The method here is distinguished from Tan, et al (2013) in its ability to (1) capture data from multiple simultaneous sources, particularly social media, (2) the focus on sentiment that requires an inference of preference and attitude, and (3) the target topic which is important in its form (broadcast and streaming media) as well as its content (the topic of the media itself). The minimal system can utilize sentiment data only, in which case it is referred to as "single-label" classification. When topical data is included as described above, then it is referred to as "multi-label". The topical data can be further decomposed into any number of subtopics making the procedure indefinitely extensible.

The classifications default into three levels; positive, negative, or neutral and indicate the sentiment for that specific analysis. However, this too can be extended to include other indicators of sentiment as required.

The learning subsystem conducts feature selection for sentiment words and topic words if multi-label classes are not known a priori. The selected features are used as inputs to each learning task. The learning subsystem identifies relationships for each specific source, between topics, source attributes, and sentiment classification. Within the framework of multi-task learning, each of these is a "task" to be learned, and each task benefits from a shared data representation (the output of the aggregation subsystem) in learning its task for each specific source.

When the learning subsystem has labelled sentiment targets, this is referred to as "supervised" learning. The procedure analyzes each stream of data for each task and confines its resolution to "positive, negative, or neutral". However, in many cases, the input data is either very sparse with partial or incomplete fields or when there is a desire to not confine the output to the predetermined three levels, then semi-supervised processing is used. The process here is similar to that described in Zhao (2015).

The procedure learns multiple inter-related tasks simultaneously from different data sources via training induction to capture intrinsic relatedness between the tasks (here that is audience, topic, and sentiment). Even though the inputs from the various sources can have different features, they all predict a common response variable, here, that is sentiment response.

The main strength of this method in this domain is that within each separate data source there may be some that have little or sparse data, while other sources may have an abundance of data. Therefore, computing multiple independent single-task-learning separately can lead to over-fitting, thus multi-task learning avoids this shortcoming and improves prediction accuracy. A way to capture task relatedness from multiple related tasks is to constrain all models to share a common set of features (joint features) if it can improve performance rather than different features. Within this domain, audience, topic, and sentiment adequately capture the shared data space that all tasks require for multi-task learning. The procedure also does feature learning by simultaneously capturing a common set of features among relevant tasks and identifies outlier tasks and eliminates them.

To address the issue of missing data from some sources, the procedure uses matrix-completion data recovery. Without this technique, data samples with missing data are removed which can dramatically reduce the number of samples in the analysis leading to poor performance.

The output of the learning subsystem is a model of sentiment response for each source (106). These can be sentiment-only relating the audience attributes to the sentiment, or can include topical information that relate all three labels.

The training subsystem (107) utilizes the models generated by the learning subsystem to generalize sentiment responses across all sources (108) that were first observed by the sourcing subsystem. At this stage, the system is able to predict viewer sentiment for a targeted audience that is based on all the input sources and all of the topical data that could be associated with sentiment for a given media instance. For example, the system can make the observation that 18-25-year-old men in New Zealand who own a dog are likely to subscribe to an online streaming media service. The system links the sentiment ("likely"=positive) of a specific audience ("18-25-year-old men in New Zealand who own a dog") to a media instance or type ("online streaming media service").

Lastly, the classification subsystem (109) determines whether the system operates in supervised or semi-supervised mode depending on whether or not target labels are used or determined dynamically (110).

INDUSTRIAL APPLICATION

The present invention can be used generally for any media content developer or owner to determine the demand by a specific audience for specific content or a specific service or type of media content delivery product.

CITATION LIST

Caruana, R. (1997). Multitask learning: A knowledge-based source of inductive bias. *Machine Learning*, 28:41-75.
Huang, S., et al. (2013) "Sentiment and topic analysis on social media: a multi-task multi-label classification approach." *Proceedings of the 5th annual ACM web science conference*. ACM, 2013.
Zhao, F., and Yuhong G. (2015) "Semi-supervised multi-label learning with incomplete labels." *Proceedings of the 24th International Conference on Artificial Intelligence*. AAAI Press.
Tan, B., et al (2013) "Multi-Transfer: Transfer Learning with Multiple Views and Multiple Sources". *Proceedings of the 2013 SIAM International Conference on Data Mining*

What is claimed is:

1. A system for broadcast and streaming media demand forecasting for predicting a response in a specific audience on a specific topic, where an audience is defined by the common attributes of viewer members, the system comprising:
    a learner for learning topical content information, audience attributes, and audience reaction from at least one different and remote data source, further comprising,
        at least one processor configured to process data from the at least one different and remote data sources;
        an extractor coupled to the at least one processor for extracting the topical content information and the audience attributes about the remote data source from each independent remote data source where the topical content information includes topics of interest and audience response expressed about said topics of interest and for associating said audience attributes with said topical content information and said audience response for each remote data source, wherein a form of the data from the remote data source includes any of the group comprised of text, imagery, and time series; and
        an aggregator coupled to the extractor for aggregating the data from the different and remote data sources by category where the categories include audience attributes comprising attributes of all audiences across all remote data sources, topical data containing indicators of all topics within the topical content information across all remote data sources, and audience responses comprising indicators of audience response towards said topics across all remote data sources;
    a trainer coupled to the learner for training a shared representation model, further comprising,
        a multi-task learner coupled to the aggregator for inductively calculating using multi-task learning, the response associated with the topical data and audience using multi-class, multi-level classification where a feature selection identifies sentiment words and topic words and each task in the multi-task learning procedure creates a relationship between topics, audience attributes, and audience response; and
        a generalizer coupled to the multi-task learner for generalizing the response across all remote data sources into a shared representation model; and
    a classifier coupled to the trainer for applying the shared representation model to a new inquiry, further comprising,
        a predictor coupled to the generalizer for predicting the audience attributes when the new inquiry provides a specific topic and expected response by classifying generalized audience attributes that predict a specific set of audience attributes from a specific topic with a specific response, for predicting the specific topic when the new inquiry provides audience attributes and an expected response by classifying generalized topics that predict a specific topic from a specific audience with a specific response, and for predicting the audience response when the new inquiry provides audience attributes and a specific topic by classifying generalized responses that predict a response from a specific audience to a specific topic.

2. The system of claim 1 wherein the extractor extracts the topical content information and the audience attributes about the remote data source from each independent remote data source where the topical content information includes only audience response and predetermined audience attributes that associate the remote data source with the specific topical content information.

3. The system of claim 1 wherein the classifier contains pre-determined classes.

4. The system of claim 1 wherein the remote data source used by the extractor includes:
    an online forum web site, a social media web site,
a wiki web site,
a blog web site,
a search history,
a loyalty database,
a viewing, download, or streaming history,
a favorites list,
a user comment to any aforementioned web site, and
offline consumer data associated with a specific product or service.

5. The system of claim 1 wherein the extractor uses a device identifier to associate a specific household with topical content information and audience attributes.

6. The system of claim 1 wherein the extractor ingests forms of data that further include:
pictures,
GIFs,
videos, and
media links.

7. The system of claim 1 wherein the trainer utilizes a single learning model from all remote data sources to create the shared representation model.

8. The system of claim 1 wherein the aggregator produces audience attributes and topical category content.

9. The system of claim 1 wherein the multi-task learner further uses multi-task learning to process multiple different and remote data sources across multiple variables to dynamically compute classifications associated with each variable.

10. The system of claim 1 wherein remote data sources with missing fields are retained using a matrix-completion data recovery method.

11. The system of claim 1 wherein the remote data source includes at least one of:
a user of a social network;
a buyer of a good or product;
a fan of a broadcast or streaming media program; and
a viewer of a broadcast or streaming media program.

12. The system of claim 2 wherein the extractor extracts topical content information from more than one remote data source.

13. The system of claim 4 wherein the audience attributes used by the extractor include:
user comments,
comment scores,
number of likes,
number of follow-on comments, and
number of in-links to the comment.

14. The system of claim 9 wherein the computed classification is one of positive, negative, and neutral.

15. A method for broadcast and streaming media demand forecasting for predicting a response in a specific audience on a specific topic, where an audience is defined by common attributes of viewer members, the steps comprising:

learning topical content information, audience attributes, and audience reaction from at least one different and remote data source, further including the steps of,
extracting the topical content information and the audience attributes about the remote data source from each independent data source where the topical content information includes topics of interest and audience response expressed about said topics of interest, and a form of the data from the remote data source includes any of the group comprised of text, imagery, and time series;
associating the audience attributes with the topical content information and the audience response for each remote data source; and
aggregating the data from the different and remote data sources by category where the categories include audience attributes comprising attributes of all audiences across all remote data sources, topical data containing indicators of all topics within the topical content information across all remote data sources, and audience response comprising indicators of audience response towards said topics across all remote data sources;
training a shared representation model, further including the steps of,
inductively calculating using multi-task learning, the response associated with the topical data and audience using multi-class, multi-level classification where a feature selection identifies sentiment words and topic words and each task in the multi-task learning procedure creates a relationship between topics, audience attributes, and audience responses; and
generalizing the response across all remote data sources into a shared representation model; and
applying the shared representation model to a new inquiry, further including the steps of,
predicting the audience attributes when the new inquiry provides a specific topic and expected response by classifying generalized audience attributes that predict a specific set of audience attributes from a specific topic with a specific response;
predicting the specific topic when the new inquiry provides audience attributes and an expected response by classifying generalized topics that predict a specific topic from a specific audience with a specific response; and
predicting the audience response when the new inquiry provides audience attributes and a specific topic by classifying generalized responses that predict a response from a specific audience to a specific topic.

* * * * *